(12) United States Patent
Mao (10) Patent No.: US 12,040,855 B2
(45) Date of Patent: Jul. 16, 2024

(54) FREQUENCY TIME DOMAIN CHANNEL HARDENING AND OVERHEAD REDUCTION

(71) Applicant: Nokia Technologies Oy, Espoo (FI)

(72) Inventor: Xiaomao Mao, Palaiseau (FR)

(73) Assignee: Nokia Technologies Oy, Espoo (FI)

( * ) Notice: Subject to any disclaimer, the term of this patent is extended or adjusted under 35 U.S.C. 154(b) by 730 days.

(21) Appl. No.: 17/258,541

(22) PCT Filed: Aug. 30, 2018

(86) PCT No.: PCT/CN2018/103329
§ 371 (c)(1),
(2) Date: Jan. 7, 2021

(87) PCT Pub. No.: WO2020/042108
PCT Pub. Date: Mar. 5, 2020

(65) Prior Publication Data
US 2021/0234574 A1 Jul. 29, 2021

(51) Int. Cl.
*H04B 7/0426* (2017.01)
*H04B 7/0417* (2017.01)
*H04B 7/06* (2006.01)

(52) U.S. Cl.
CPC ........... *H04B 7/043* (2013.01); *H04B 7/0417* (2013.01); *H04B 7/0617* (2013.01); *H04B 7/0626* (2013.01)

(58) Field of Classification Search
CPC .... H04B 7/0417; H04B 7/043; H04B 7/0456; H04B 7/0617; H04B 7/0626
See application file for complete search history.

(56) References Cited

U.S. PATENT DOCUMENTS 8,644,402 B2 * 2/2014 Abrishamkar ...... H04L 25/0234
375/267
9,184,806 B2 * 11/2015 Kim .................... H04B 7/0639
(Continued)

FOREIGN PATENT DOCUMENTS

AU 2009208166 A1 * 9/2009 ........... H04B 7/0408
AU 2017374457 A1 * 5/2019 ........... H04B 7/0417
(Continued)

OTHER PUBLICATIONS

Sook et al., English Machine Translation of the Description of KR20100120970A, Espacenet (accessed Aug. 23, 2023) (Year: 2010).*
(Continued)

*Primary Examiner* — Eric Nowlin
(74) *Attorney, Agent, or Firm* — Barta Jones, PLLC (57) ABSTRACT

In accordance with some embodiments, an apparatus may include means for determining time and frequency domain correlation of at least one channel with respect to direction of at least one dominant Eigen beam. The apparatus may further include means for applying at least one common channel hardening matrix within the correlation time and bandwidth based on a first time periodicity. The apparatus may further include means for applying a 2-dimensional fast fourier transform within the correlation time and bandwidth associated with the at least one common channel hardening matrix. The apparatus may further include means for reporting at least one tap location based on a second time periodicity that is associated with the at least one common channel hardening matrix to at least one network entity.

20 Claims, 11 Drawing Sheets

(56) References Cited

U.S. PATENT DOCUMENTS

| | | | |
|---|---|---|---|
| 9,362,997 B2* | 6/2016 | Kim | H04W 16/28 |
| 9,413,474 B2 | 8/2016 | Chai et al. | |
| 10,547,368 B2* | 1/2020 | Rahman | H04L 5/0057 |
| 10,567,054 B2* | 2/2020 | Liu | H04B 7/0478 |
| 10,873,439 B2* | 12/2020 | Onggosanusi | H04W 72/21 |
| 11,133,907 B2* | 9/2021 | Interdonato | H04L 5/0051 |
| 11,502,805 B2* | 11/2022 | Davydov | H04L 5/0007 |
| 2006/0133530 A1* | 6/2006 | Kwak | H04L 1/04 375/267 |
| 2009/0016425 A1 | 1/2009 | Hui et al. | |
| 2011/0286558 A1* | 11/2011 | Abrishamkar | H04L 25/0234 375/346 |
| 2015/0049824 A1* | 2/2015 | Kim | H04B 7/0695 375/267 |
| 2016/0013847 A1* | 1/2016 | Kim | H04B 7/0417 375/267 |
| 2016/0065344 A1 | 3/2016 | Lee et al. | |
| 2017/0257884 A1 | 9/2017 | Rahman et al. | |
| 2017/0331577 A1 | 11/2017 | Parkvall et al. | |
| 2018/0175993 A1* | 6/2018 | Onggosanusi | H04W 72/542 |
| 2019/0181930 A1* | 6/2019 | Liu | H04B 7/065 |
| 2020/0007214 A1* | 1/2020 | Gao | H04L 5/0023 |
| 2020/0220677 A1* | 7/2020 | Interdonato | H04L 5/0048 |
| 2021/0044409 A1* | 2/2021 | Davydov | H04L 1/1671 |
| 2021/0111853 A1* | 4/2021 | Onggosanusi | H04B 7/0486 |
| 2021/0391910 A1* | 12/2021 | Wu | H04B 7/0617 |

FOREIGN PATENT DOCUMENTS

| | | | | |
|---|---|---|---|---|
| AU | 2017374457 B2 * | 3/2022 | | H04B 7/0417 |
| AU | 2022204501 A1 * | 7/2022 | | H04B 7/0417 |
| CA | 2587846 A1 * | 5/2006 | | |
| CA | 3047229 A1 * | 6/2018 | | H04B 7/0417 |
| CN | 101120529 A * | 2/2008 | | H04B 7/0408 |
| CN | 102013956 A | 4/2011 | | |
| CN | 102870362 A | 1/2013 | | |
| CN | 103299558 A | 9/2013 | | |
| CN | 103999418 A | 8/2014 | | |
| CN | 107124769 A | 9/2017 | | |
| CN | 107294880 A | 10/2017 | | |
| CN | 107707285 A * | 2/2018 | | H04B 7/04 |
| CN | 110073620 A * | 7/2019 | | H04B 7/0417 |
| CN | 107707285 B * | 4/2021 | | H04B 7/04 |
| CN | 112930650 A * | 6/2021 | | H04B 7/0408 |
| CN | 110073620 B * | 8/2022 | | H04B 7/0417 |
| CN | 115426091 A * | 12/2022 | | H04B 7/0417 |
| DE | 112018000206 T5 * | 8/2019 | | H04L 1/1671 |
| EP | 3484061 A1 * | 5/2019 | | H04B 7/04 |
| EP | 3484061 A4 * | 6/2019 | | H04B 7/04 |
| EP | 3484061 B1 * | 4/2020 | | H04B 7/04 |
| EP | 3688880 B1 * | 6/2021 | | H04B 7/0413 |
| JP | 7191827 B2 * | 12/2022 | | H04B 7/0417 |
| JP | 2023036643 A * | 3/2023 | | H04B 7/0417 |
| KR | 20100120970 A * | 11/2010 | | |
| KR | 101062446 B1 * | 9/2011 | | |
| KR | 101995431 B1 * | 7/2019 | | |
| KR | 20190088045 A * | 7/2019 | | |
| KR | 2020502922 A * | 1/2020 | | |
| KR | 102472227 B1 * | 11/2022 | | |
| KR | 20220162879 A * | 12/2022 | | |
| TW | 201125325 A * | 7/2011 | | H04L 25/0234 |
| WO | WO-2006055241 A2 * | 5/2006 | | H04B 7/0408 |
| WO | WO-2011066296 A1 * | 6/2011 | | H04L 25/0234 |
| WO | 2015/003367 A1 | 1/2015 | | |
| WO | WO-2015003367 A1 * | 1/2015 | | H04L 5/00 |
| WO | 2017/152929 A1 | 9/2017 | | |
| WO | WO-2018024157 A1 * | 2/2018 | | H04B 7/04 |
| WO | WO-2018111007 A1 * | 6/2018 | | H04B 7/0417 |
| WO | WO-2019032802 A1 * | 2/2019 | | H04L 1/1671 |
| WO | WO-2019066709 A1 * | 4/2019 | | H04B 7/0413 |
| WO | 2019/218317 A1 | 11/2019 | | |
| WO | WO-2020087529 A1 * | 5/2020 | | |
| WO | WO-2020088496 A1 * | 5/2020 | | H04B 7/0408 |

OTHER PUBLICATIONS

Partial European Search Report received for corresponding European Patent Application No. 18931578.1, dated Mar. 22, 2022, 11 pages.

Luo et al., "A Scalable Framework for CSI Feedback in FDD Massive MIMO via DL Path Aligning", IEEE Transactions on Signal Processing, vol. 65, No. 18, Sep. 15, 2017, pp. 4702-4716.

Yoon et al., "Space-Frequency Precoding with Space-Tap Correlation Information at the Transmitter", IEEE Transactions on Communications, vol. 55, No. 9, Sep. 2007, pp. 1702-1711.

Extended European Search Report received for corresponding European Patent Application No. 18931578.1, dated Aug. 8, 2022, 13 pages.

Office action received for corresponding Chinese Patent Application No. 201880095814.4, dated Apr. 23, 2023, 3 pages of office action and no page of translation available.

Marzetta et al., "Fundamentals of Massive MIMO", Cambridge: Cambridge University Press, 2016, 240 pages.

International Search Report and Written Opinion received for corresponding Patent Cooperation Treaty Application No. PCT/CN2018/103329, dated May 29, 2019, 9 pages.

"CSI acquisition framework for DL NR MIMO", 3GPP TSG RAN WG1 88, R1-1702943, Agenda : 8.1.2.3.1, Samsung, Feb. 13-17, 2017, 5 pages.

Office action received for corresponding Chinese Patent Application No. 201880095814.4, dated Aug. 18, 2022, 8 pages of office action and no page of translation available.

Office action received for corresponding Chinese Patent Application No. 201880095814.4, dated Aug. 17, 2023, 3 pages of office action and no page of translation available.

* cited by examiner

FREQUENCY TIME DOMAIN CHANNEL HARDENING AND OVERHEAD REDUCTION

RELATED APPLICATION

This application was originally filed as PCT Application No. PCT/CN2018/103329 on Aug. 30, 2018. Each of which is incorporated herein by reference in its entirety.

BACKGROUND

Field

Certain embodiments may relate to communication systems. For example, some embodiments may relate to channel state information feedback.

Description of the Related Art

In a Multiple Input Multiple Output (MIMO) system, channel state information (CSI) feedback is designed to provide a balance between implementation complexity/reporting overhead of user equipment (UE) and CSI reconstructing accuracy. CSI feedback may include CSI estimations of user equipment, CSI reporting, and/or CSI reconstructing at a network entity.

In order to reduce the overhead associated with CSI reporting, Discrete Fourier Transform (DFT) precoders may be selected and applied to harden communication channels, where the dimensions of the channel are reduced from M×N to B×N, where M is the number of transmit antenna, N is the number of receive antenna, and B is the number of precoders employed, which may also be considered as virtual transmit ports. When DFT precoders are applied as narrow beams to the channel, the resulting aggregate channel matrix becomes sparse due to channel hardening effects arising from the law of large numbers, and the report overhead is reduced.

Channel Eigen beams may replace DFT precoders to improve the channel hardening and make the channel even sparser, and thus better prepared for further reporting methods. By using channel reciprocity, the Eigen beams may be calculated by network entities and applied using Class B CSI-RS, which relieves UE from the high complexity of Eigen decompositions.

However, with DFT precoders or Eigen beams, channel hardening may be done in a wideband manner, where only one set of channel basis are selected or computed across the whole frequency bandwidth for channel estimation. This may drastically lower the complexity of UE side computation, as well as the reporting overhead, for example indexes of the DFT precoders, or Eigen beams, or wideband beams for Type II CSI. This is due to the correlation of channel in frequency domain with respect to the direction of the dominant Eigen beams. After applying wideband channel hardening, the aggregated channel may look flattened in the frequency domain.

In addition to channel correlation in the frequency domain, correlation in the time domain may also be used to simplify the channel hardening, thus to lower the computation complexity and reduce the reporting overhead. For example, in Type II CSI reporting, the reporting timing of wideband beams may be associated with their combining coefficients. However, this is an inefficient design since the wideband beams can sustain longer than their combining coefficients, separate reporting of the wideband beams and their combining coefficients can reduce the reporting overhead.

SUMMARY

In accordance with some embodiments, a method may include determining, by user equipment, time frequency granularity of at least one channel with respect to direction of at least one dominant Eigen beam. The method may further include applying, by the user equipment, at least one common channel hardening matrix within the correlation time and bandwidth based on a first time periodicity. The method may further include applying, by the user equipment, a 2-dimensional fast Fourier transform within the correlation time and bandwidth associated with the at least one common channel hardening matrix. The method may further include reporting, by the user equipment, at least one tap value and location based on a second time periodicity that is associated with the at least one common channel hardening matrix to at least one network entity.

In accordance with some embodiments, an apparatus may include means for determining time frequency granularity of at least one channel with respect to direction of at least one dominant Eigen beam. The apparatus may further include means for applying at least one common channel hardening matrix within the correlation time and bandwidth based on a first time periodicity. The apparatus may further include means for applying a 2-dimensional fast Fourier transform within the correlation time and bandwidth associated with the at least one common channel hardening matrix. The apparatus may further include means for reporting at least one tap value and location based on a second time periodicity that is associated with the at least one common channel hardening matrix to at least one network entity.

In accordance with some embodiments, an apparatus may include at least one processor and at least one memory including computer program code. The at least one memory and the computer program code can be configured to, with the at least one processor, cause the apparatus to at least determine time frequency granularity of at least one channel with respect to direction of at least one dominant Eigen beam. The at least one memory and the computer program code can be further configured to, with the at least one processor, cause the apparatus to at least apply at least one common channel hardening matrix within the correlation time and bandwidth based on a first time periodicity. The at least one memory and the computer program code can be further configured to, with the at least one processor, cause the apparatus to at least apply a 2-dimensional fast Fourier transform within the correlation time and bandwidth associated with the at least one common channel hardening matrix. The at least one memory and the computer program code can be further configured to, with the at least one processor, cause the apparatus to at least report at least one tap value and location based on a second time periodicity that is associated with the at least one common channel hardening matrix to at least one network entity.

In accordance with some embodiments, a non-transitory computer readable medium can be encoded with instructions that may, when executed in hardware, perform a method. The method may determine time frequency granularity of at least one channel with respect to direction of at least one dominant Eigen beam. The method may further apply at least one common channel hardening matrix within the correlation time and bandwidth based on a first time periodicity. The method may further apply a 2-dimensional fast Fourier transform within the correlation time and bandwidth associated with the at least one common channel hardening matrix. The method may further report at least one tap value and location based on a second time periodicity that is associated with the at least one common channel hardening matrix to at least one network entity.

In accordance with some embodiments, a computer program product may perform a method. The method may determine time frequency granularity of at least one channel with respect to direction of at least one dominant Eigen beam. The method may further apply at least one common channel hardening matrix within the correlation time and bandwidth based on a first time periodicity. The method may further apply a 2-dimensional fast Fourier transform within the correlation time and bandwidth associated with the at least one common channel hardening matrix. The method may further report at least one tap value and location based on a second time periodicity that is associated with the at least one common channel hardening matrix to at least one network entity.

In accordance with some embodiments, an apparatus may include circuitry configured to determine time frequency granularity of at least one channel with respect to direction of at least one dominant Eigen beam. The circuitry may further apply at least one common channel hardening matrix within the correlation time and bandwidth based on a first time periodicity. The circuitry may further apply a 2-dimensional fast Fourier transform within the correlation time and bandwidth associated with the at least one common channel hardening matrix. The circuitry may further report at least one tap value and location based on a second time periodicity that is associated with the at least one common channel hardening matrix to at least one network entity.

In accordance with some embodiments, a method may include receiving, by a network entity, at least one tap location that is associated with at least one common channel hardening matrix from a user equipment, wherein the at least one common channel hardening matrix is within a correlation time and bandwidth associated with a 2-dimensional fast Fourier transform and based on a first time periodicity, and the at least one tap value and location is associated with the at least one common channel hardening matrix and based on a second time periodicity.

In accordance with some embodiments, an apparatus may include means for receiving at least one tap location that is associated with at least one common channel hardening matrix from a user equipment, wherein the at least one common channel hardening matrix is within a correlation time and bandwidth associated with a 2-dimensional fast Fourier transform and based on a first time periodicity, and the at least one tap value and location is associated with the at least one common channel hardening matrix and based on a second time periodicity.

In accordance with some embodiments, an apparatus may include at least one processor and at least one memory including computer program code. The at least one memory and the computer program code can be configured to, with the at least one processor, cause the apparatus to at least receive at least one tap location that is associated with at least one common channel hardening matrix from a user equipment, wherein the at least one common channel hardening matrix is within a correlation time and bandwidth associated with a 2-dimensional fast Fourier transform and based on a first time periodicity, and the at least one tap value and location is associated with the at least one common channel hardening matrix and based on a second time periodicity.

In accordance with some embodiments, a non-transitory computer readable medium can be encoded with instructions that may, when executed in hardware, perform a method. The method may receive at least one tap location that is associated with at least one common channel hardening matrix from a user equipment, wherein the at least one common channel hardening matrix is within a correlation time and bandwidth associated with a 2-dimensional fast fourier transform and based on a first time periodicity, and the at least one tap value and location is associated with the at least one common channel hardening matrix and based on a second time periodicity.

In accordance with some embodiments, a computer program product may perform a method. The method may receive at least one tap location that is associated with at least one common channel hardening matrix from a user equipment, wherein the at least one common channel hardening matrix is within a correlation time and bandwidth associated with a 2-dimensional fast fourier transform and based on a first time periodicity, and the at least one tap location is associated with the at least one common channel hardening matrix and based on a second time periodicity.

In accordance with some embodiments, an apparatus may include circuitry configured to receive at least one tap location that is associated with at least one common channel hardening matrix from a user equipment, wherein the at least one common channel hardening matrix is within a correlation time and bandwidth associated with a 2-dimensional fast Fourier transform and based on a first time periodicity, and the at least one tap value and location is associated with the at least one common channel hardening matrix and based on a second time periodicity.

In accordance with some embodiments, a method may include selecting and reporting, by user equipment, at least one channel hardening matrix and the tap value and location of the aggregated channel after channel hardening, wherein the reporting granularities of the channel hardening matrix and the taps are different. The method may further include generating and reporting, by the user equipment, Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, an apparatus may include at least one processor and at least one memory including computer program code. The at least one memory and the computer program code can be configured to, with the at least one processor, cause the apparatus to at least select and report at least one channel hardening matrix and the tap value and location of the aggregated channel after channel hardening, wherein the reporting granularities of the channel hardening matrix and the taps are different. The at least one memory and the computer program code can be further configured to, with the at least one processor, cause the apparatus to at least generate and report Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, a non-transitory computer readable medium can be encoded with instructions that may, when executed in hardware, perform a method. The method may select and report at least one channel hardening matrix and the tap value and location of the aggregated channel after channel hardening, wherein the reporting granularities of the channel hardening matrix and the taps are different. The method may further generate and report Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, a computer program product may perform a method. The method may select and report at least one channel hardening matrix and the tap value and location of the aggregated channel after channel hardening, wherein the reporting granularities of the channel hardening matrix and the taps are different. The method may further generate and report Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, a computer program product may perform a method. The method may select and report at least one channel hardening matrix and the tap value and location of the aggregated channel after channel hardening, wherein the reporting granularities of the channel hardening matrix and the taps are different. The method may further generate and report Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, an apparatus may include circuitry configured to select and report at least one channel hardening matrix and the tap value and location of the aggregated channel after channel hardening, wherein the reporting granularities of the channel hardening matrix and the taps are different. The apparatus may include circuitry further configured to generate and report Type II channel state information (CSI) feedback configured with at least one frequency reporting granularity and/or at least one time reporting granularity, wherein Type II CSI part 1 and part 2 are associated with different reporting granularities in frequency and time.

In accordance with some embodiments, a method may include receiving, by a network entity, Type II CSI feedback configured with at least one frequency reporting granularity and/or at least one time reporting granularity, wherein part 1 and part 2 are associated with different reporting granularity in frequency and time.

In accordance with some embodiments, an apparatus may include at least one processor and at least one memory including computer program code. The at least one memory and the computer program code can be configured to, with the at least one processor, cause the apparatus to at least receive Type II CSI feedback configured with at least one frequency reporting granularity and/or at least one time reporting granularity, wherein part 1 and part 2 are associated with different reporting granularity in frequency and time.

In accordance with some embodiments, a non-transitory computer readable medium can be encoded with instructions that may, when executed in hardware, perform a method. The method may receive Type II CSI feedback configured with at least one frequency reporting granularity and/or at least one time reporting granularity, wherein part 1 and part 2 are associated with different reporting granularity in frequency and time.

In accordance with some embodiments, a computer program product may perform a method. The method may receive Type II CSI feedback configured with at least one frequency reporting granularity and/or at least one time reporting granularity, wherein part 1 and part 2 are associated with different reporting granularity in frequency and time.

In accordance with some embodiments, a computer program product may perform a method. The method may receive Type II CSI feedback configured with at least one frequency reporting granularity and/or at least one time reporting granularity, wherein part 1 and part 2 are associated with different reporting granularity in frequency and time.

In accordance with some embodiments, an apparatus may include circuitry configured to receive Type II CSI feedback configured with at least one frequency reporting granularity and/or at least one time reporting granularity, wherein part 1 and part 2 are associated with different reporting granularity in frequency and time.

BRIEF DESCRIPTION OF THE DRAWINGS

For proper understanding of this disclosure, reference should be made to the accompanying drawings, wherein.

DETAILED DESCRIPTION

Certain embodiments described herein may simplify channel hardening, reduce reporting overhead for CSI feedback and/or lower UE computation complexity. Certain embodiments are, therefore, directed to improvements in computer-related technology, specifically, by conserving network resources and reducing power consumption of network entities and/or user equipment located within the network.

Channel correlation in the frequency domain and time domain with respect to the direction of the dominant Eigen beams may be used in a simplified 2-dimensional channel hardening method. Upon applying channel hardening, an aggregated channel may look flattened in both the frequency domain and the time domain. For explicit feedback, the techniques proposed herein may apply 2-dimensional fast Fourier transform (FFT) after channel hardening to create a sparser channel in a delay-Doppler plane. The resulting channel may contain fewer taps and/or with more stable tap locations, which may reduce the reporting overhead. The techniques proposed herein may also indicate time domain decoupling between part 1 and part 2 of Type II CSI feedback, where reporting of part 1 and part 2 may result in different periodicity and/or offset to capture the various time-domain correlation properties. The part 1 and part 2 may be reported at different time instance. The reporting of part 1 and part 2 may be triggered by an aperiodic CSI reporting procedure.

In some embodiments, at least one channel vector at subband i estimated at subframe n may be denoted as $h_i(n)$, and the spatial channel covariance matrix may be indicated as $R_i(n)=h_i^H(n) \cdot h_i(n)$. Then, the Eigen decomposition of $R_i(n)$ may be determined using $U_i(n) \cdot \Lambda_i(n) \cdot U_i^H(n)$, where $U_i(n)$ is the square matrix whose $j^{th}$ column $q_{i,j}(n)$ is the Eigen vector of $R_i(n)$, and $\Lambda_i(n)$ is the diagonal matrix whose diagonal elements are the corresponding Eigen values.

When a number $B_i(n)$ of Eigen vectors is selected to form a channel hardening matrix $Q_i(n)=[q_{i,1}(n), q_{i,2}(n), \ldots, q_{i,Bi(n)}(n)]$, the resulting channel is $\Phi_i(n)=h_i(n) \cdot Q_i(n)$, which may result in a sparser channel. In some embodiments, the resulting channel $\Phi_i(n)$ may result in only one or more taps remaining for each of the selected Eigen vectors.

In certain embodiments, the aggregated channel may be collected in both frequency domain and time domain for explicit feedback. Furthermore, 2-dimensional Fourier transform and/or symplectic Fourier transform may be performed, and the CIR in delay-doppler plane is arrived. The CIR may also be reported in the delay-Doppler plane.

In some embodiments, $R=\Sigma_T \Sigma_F R_i(n)$, where T denotes channel correlation time, and F denotes channel correlation bandwidth. The Eigen decomposition of R may be determined by $R=U \cdot \Lambda \cdot U^H$. Furthermore, a number B of Eigen vectors may be selected to form a common channel hardening matrix $Q_{T,F}$, and apply the channel hardening matrix to channel at subband i, subframe n within the channel correlation time T and correlation bandwidth F to get the aggregated channel $\Phi_i(n)=h_i(n) \cdot Q_{T,F}$.

Figure 1:
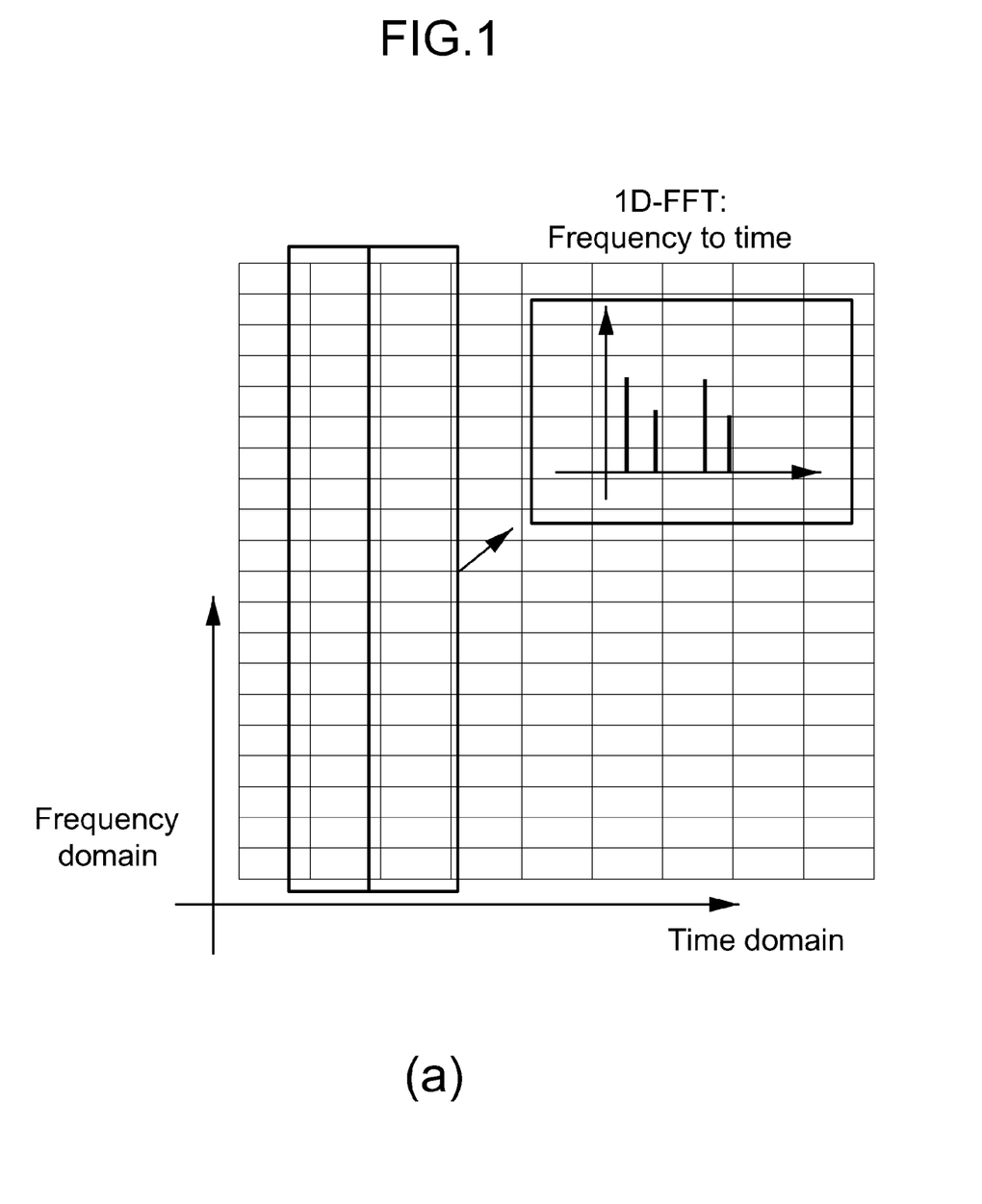
FIG. 1 illustrates an example of 2-dimensional fast fourier transform results associated with compression and tap location updates according to certain embodiments.

FIG. 1 illustrates two consecutive tap reporting instances after 1-D FFT, which are similar due to the correlation in time, 2-D FFT may utilize the time-domain correlation and abstract off the similarity in time domain. However, the illustration in (b) displays a compressed channel with fewer taps after 2-D FFT. Thus, there is a reduction of overhead when reporting the taps. In addition, collecting aggregated channel in correlation time to achieve the best compression may introduce additional latency. Furthermore, a tradeoff between latency and compression efficiency may be achieved by configuring a collection time window. In other embodiments, if a running time window with a length of correlation time is applied, and/or the tap reporting is at a constant periodicity, the reporting overhead may remain while the CSI feedback performance is enhanced with greater computation complexity.

In some embodiments, channel delay spread and/or Doppler spread may be performed by a UE side channel estimation module in order to perform timing advance and/or positioning. Correlation time and bandwidth may be calculated as a reciprocal of delay spread and Doppler spread. However, determining collection time window and frequency band size may be associated with tradeoffs between implementation complexity, overhead, and channel estimation accuracy. In some embodiments, wideband channel hardening where in frequency domain one common channel hardening matrix is associated with the whole bandwidth, for example, as associated with Type II CSI feedback and/or other explicit feedback methods rather than correlation bandwidth, may further lower the complexity and/or reporting overhead, while also affecting CSI feedback accuracy.

Figure 2:
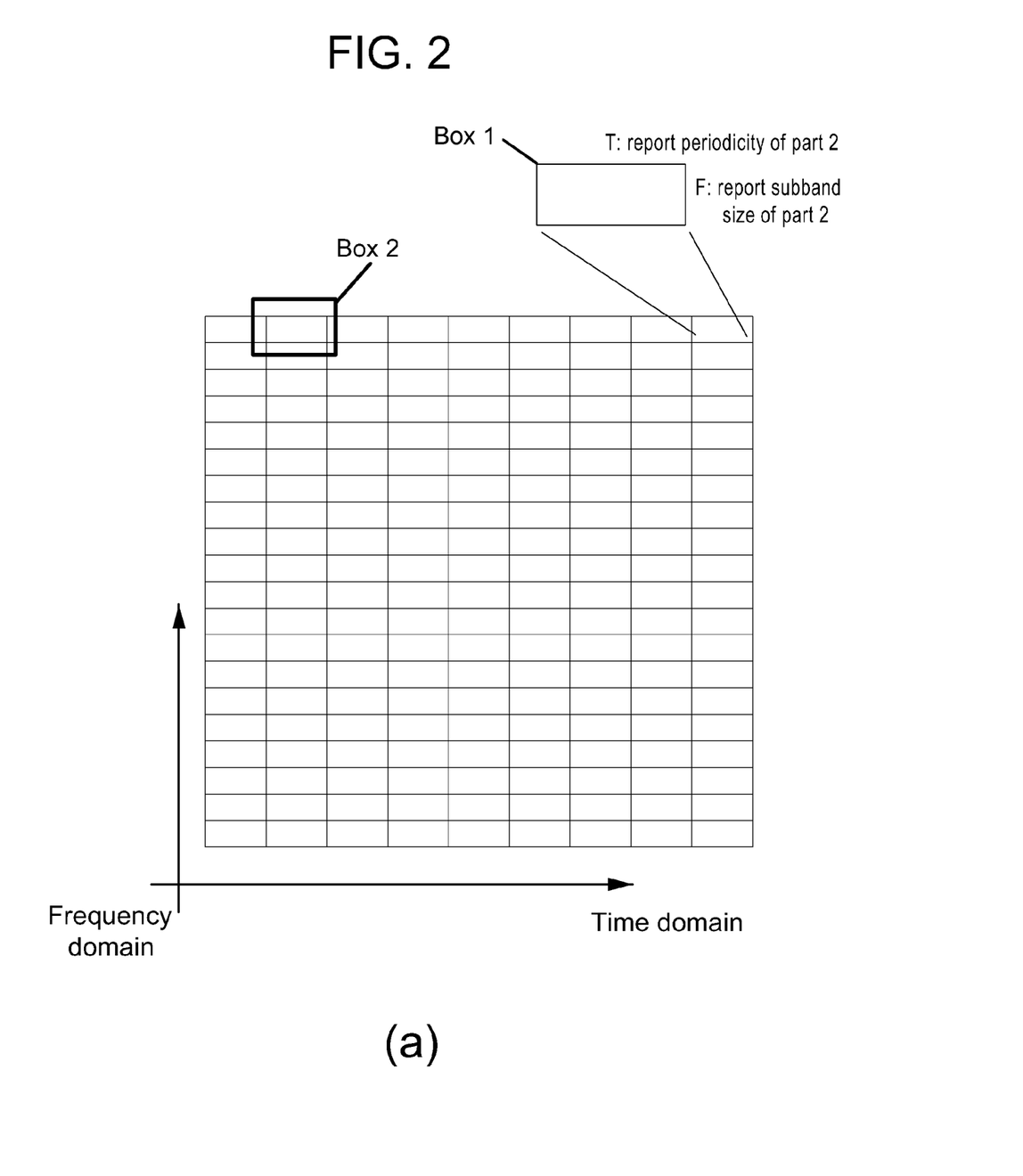
FIG. 2 illustrates an example of the tradeoff between complexity, latency, and channel estimation accuracy associated with time-frequency domain breathing according to certain embodiments.

In certain embodiments, Type II CSI feedback may be configured with at least one frequency reporting granularity and/or at least one time reporting granularity. The reporting granularity for the beam indexes may be set with channel correlation time T and correlation bandwidth F for user equipment. As illustrated in FIG. 2, with respect to the processing complexity and feedback latency of the user equipment, the reporting granularity of the beam indexes may be configured to be associated with breathing between correlation bandwidth F and the entire bandwidth in the frequency domain between the correlation time T and one subframe in the time domain. As shown in FIG. 2, box 1 illustrates the second part of reporting granularity of part 2 of Type II CSI in frequency time domain, while box 2 illustrates the reporting granularity of part 1 of type II CSI. In addition, FIG. 2 also illustrates in (a) an example of best accuracy with overhead redundancy, (b) an example of best accuracy with lean overhead, (c) an example of breathing between latency and complexity, (d) another example of breathing between latency and complexity, and (e) an example of using the least overhead case.

For explicit feedback, channel hardening may be performed for all subbands at one subframe, i.e. wideband channel hardening in frequency domain, then 1-D FFT may be applied to transform the aggregated channel to time domain, where the taps and their locations in time domain are reported back to the network entity to reconstruct the channel. In some embodiments, channel hardening may be performed in two dimensions, in particular, the frequency domain and time domain. Once channel hardening has been performed, 2-D FFT may be performed to transform the aggregated channel to a delay-Doppler plane, and taps and their locations (CIR) in a delay-Doppler plane may be reported back for explicit feedback.

For Type II CSI, the reporting of part 1 and part 2 may include beam indexes and/or their combining coefficients. With respect to beam indexes, user equipment may select at least one set of predefined DFT precoders, and report the indexes. In certain embodiments, the DFT precoders may be interpreted as a common channel basis, such as a channel hardening matrix, within a correlation time T and correlation bandwidth F. In such cases, at least one channel at subband i, subframe n may be constructed by combining the channel basis with their complex coefficients.

In some embodiments, with respect to channel hardening matrices, if at least one channel hardening matrix is calculated by the user equipment, reporting at least one channel hardening matrix and/or the reporting of taps may be configured with different frequencies and/or time reporting granularities. In some embodiments, the reporting of channel hardening matrices may be configured as correlation time T and correlation bandwidth F.

In certain embodiments, with respect the processing complexity by the user equipment and feedback latency, reporting granularity of the channel hardening matrix may be configured with breathing between correlation bandwidth F and the entire bandwidth in frequency domain while between correlation time T and one subframe in time domain.

Figure 3:
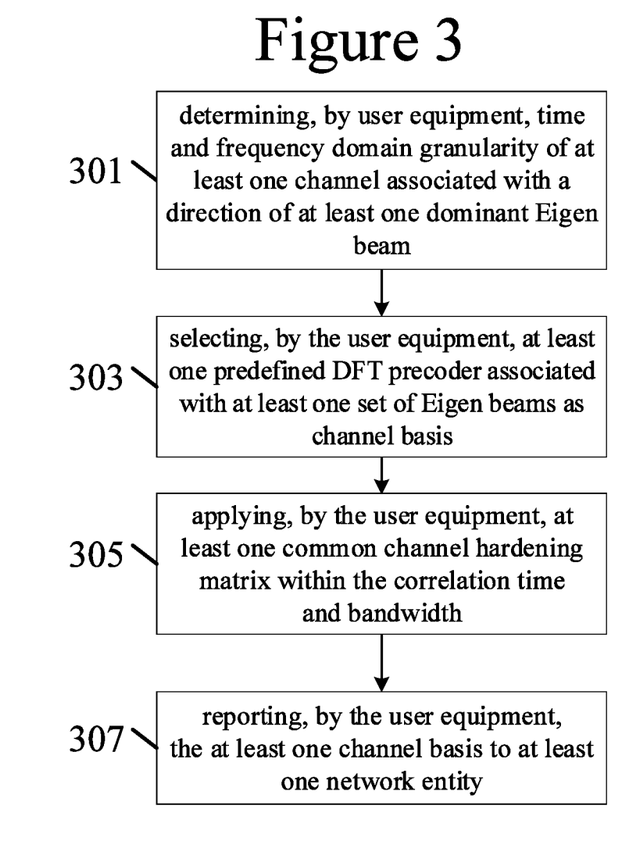
FIG. 3 illustrates an example of a method performed by a user equipment according to certain embodiments.
Figure 6:
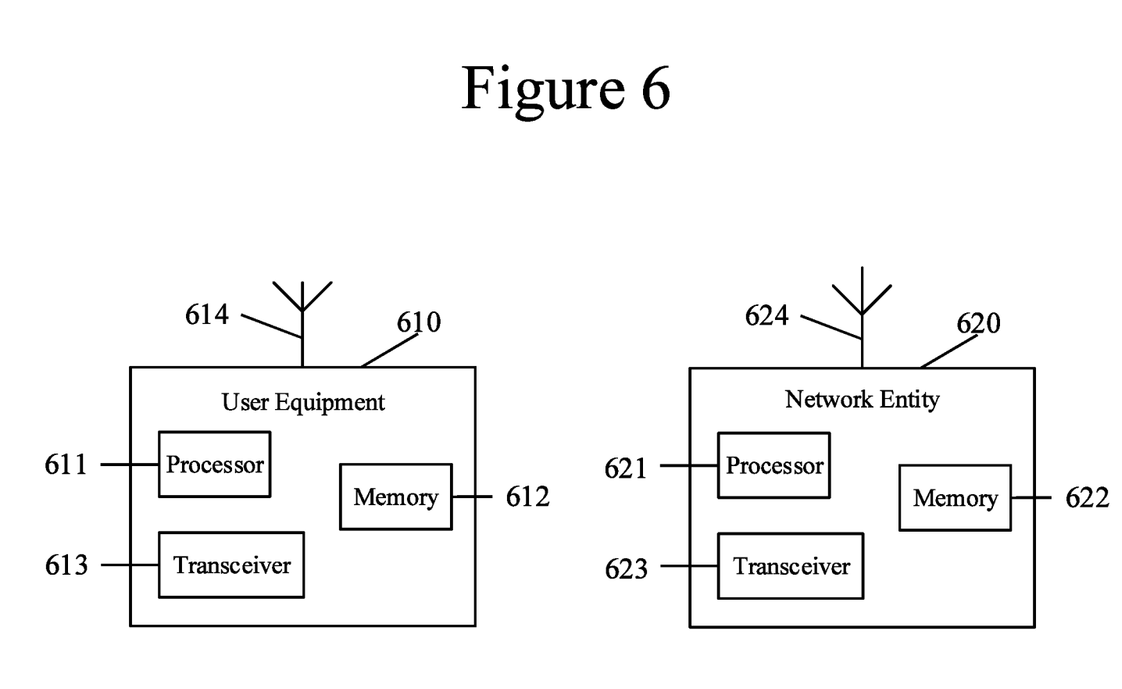
FIG. 6 illustrates an example of a system according to certain embodiments.

FIG. 3 illustrates an example of a method performed by user equipment, such as user equipment 610 in FIG. 6. In step 301, the user equipment may determine time and frequency domain granularity of at least one channel associated with a direction of at least one dominant Eigen beam. In step 303, the user equipment may select at least one predefined DFT precoder associated with at least one set of Eigen beams as channel basis. In step 305, the user equipment may apply at least one common channel hardening matrix within the correlation time and bandwidth. In step 307, the user equipment may report at least one channel basis to at least one network entity, such as network entity 620 in FIG. 6.

Figure 4:
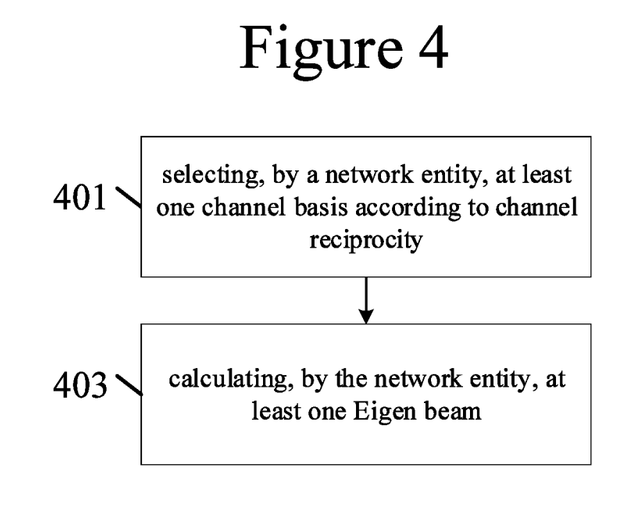
FIG. 4 illustrates an example of a method performed by a network entity according to certain embodiments.

FIG. 4 illustrates an example of a method performed by a network entity, such as user equipment 610 in FIG. 6. In step 401, the network entity may select at least one channel basis according to channel reciprocity. The reciprocity based channel hardening is done within frequency time domain. The network entity, for example gNB, computes at least one uplink channel and gets at least one channel basis. In step 403, the network entity may calculate at least one Eigen beam. The at least one Eigen beam may be applied using Class B CSI-RS.

Figure 5:
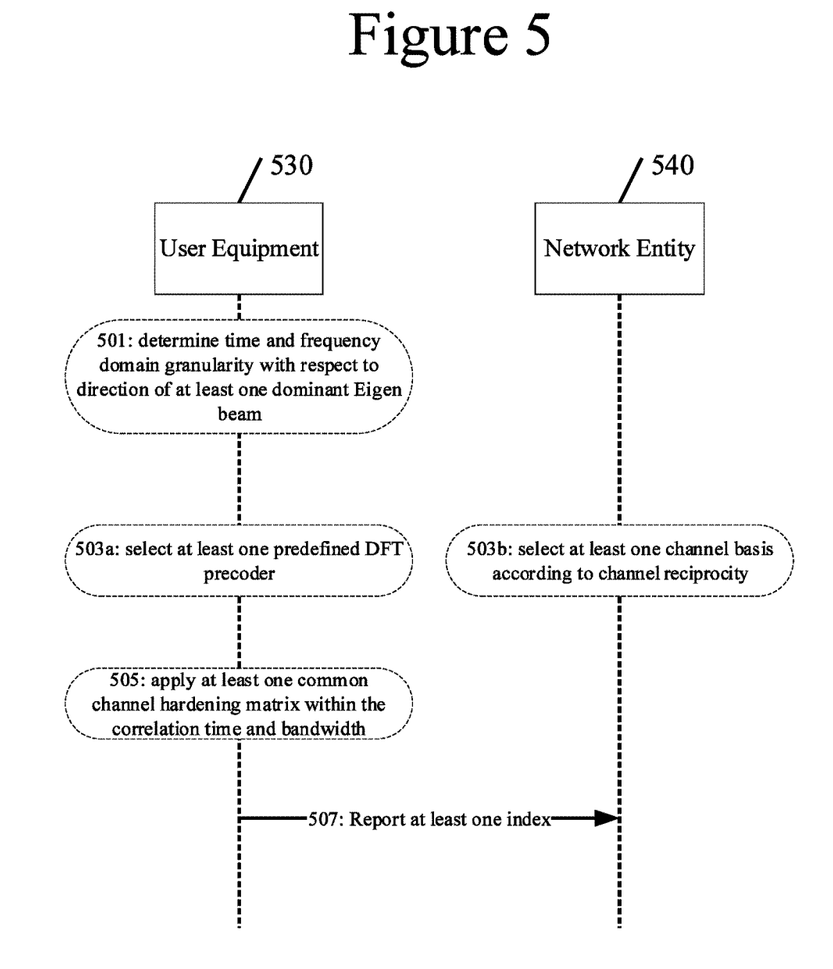
FIG. 5 illustrates an example of a system according to certain embodiments.

FIG. 5 illustrates an example of a system according to certain embodiments. In one embodiment, a system may include multiple devices, such as, for example, user equipment 530 and/or network entity 540, which may be similar to user equipment 510 and network entity 520, respectively, as illustrated in FIG. 5. In step 501, user equipment 530 may determine time and frequency domain granularity of at least one channel associated with a direction of at least one dominant Eigen. In step 503*a*, user equipment 530 may select at least one predefined DFT precoder associated with at least one set of Eigen beams as channel basis. Alternatively, in step 503*b*, network entity 540 may select at least one channel basis according to channel reciprocity. The reciprocity based channel hardening is done within frequency time domain. The network entity, for example gNB, computes at least one uplink channel and gets one channel hardening matrix, which is later applied to frequency time resources as indicated by correlation time and frequency, or predefined time and frequency resources. In step 505, user equipment 530 may apply at least one common channel hardening matrix within the correlation time and bandwidth. In step 507, user equipment 530 may report at least one of the at least one of the at least one common channel hardening matrices to network entity 540.

FIG. 6 illustrates an example of a system according to certain embodiments. In one embodiment, a system may include multiple devices, such as, for example, user equipment 610 and/or network entity 620.

User equipment 610 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 620 may be one or more of a base station, such as an evolved node B (eNB) or 5G or New Radio node B (gNB), a serving gateway, a server, and/or any other access node or combination thereof. Furthermore, user equipment 610 and/or network entity 620 may be one or more of a citizens broadband radio service device (CBSD).

One or more of these devices may include at least one processor, respectively indicated as 611 and 621. Processors 611 and 621 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 612 and 622. The memory may be fixed or removable. The memory may include computer program instructions or computer code contained therein. Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 611 and 621 and memories 612 and 622 or a subset thereof, may be configured to provide means corresponding to the various blocks of FIGS. 1-5. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple radio access technologies. Other configurations of these devices, for example, may be provided. Transceivers 613 and 623 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
5G 5th Generation Wireless System
CIR Channel Impulse Response
CSI Channel State Information
CSI-RS Channel State Information Reference Signal
DFT Discrete Fourier Transform
eNB evolved Node B
E-UTRAN Evolved Universal Mobile Telecommunications System Terrestrial Radio Access Network
FFT Fast Fourier Transform
gNB Next Generation Node B LTE Long Term Evolution
MIMO Multiple Input Multiple Output
MU Multi-user
NE Network Entity
RS Reference Signal
UE User Equipment

What is claimed is:

1. An apparatus, comprising:
   at least one processor; and
   at least one memory including computer program code, wherein the at least one memory and the computer program code are configured to, with the at least one processor, cause the apparatus to:
      determine time and frequency domain correlation of at least one channel with respect to direction of at least one dominant Eigen beam;
      apply at least one common channel hardening matrix within a correlation time and bandwidth based on a first time periodicity;
      apply a 2-dimensional fast Fourier transform within the correlation time and bandwidth associated with the at least one common channel hardening matrix; and
      report at least one tap value and location based on a second time periodicity that is associated with the at least one common channel hardening matrix to at least one network entity.

2. The apparatus according to claim 1, wherein the at least one memory and the computer program code are further configured to, with the at least one processor, cause the apparatus to:
   select at least one predefined discrete Fourier transform precoders associated with at least one set of Eigen beams as channel basis.

3. The apparatus according to claim 1, wherein the 2-dimensional fast Fourier transform is configured to reduce reporting overhead when 2-dimensional fast Fourier transform is applied to an aggregated channel.

4. The apparatus according to claim 1, wherein a granularity of the reporting is configured to be associated with breathing between correlation bandwidth and an entire bandwidth in a frequency domain between the correlation time and one subframe in a time domain.

5. The apparatus according to claim 1, wherein the at least one memory and the computer program code are further configured to, with the at least one processor, cause the apparatus to:
   configure a collection time window configured to achieve a tradeoff between latency and reporting precision; or
   configure a collection frequency band window to achieve a tradeoff between complexity and precision of reporting.

6. The apparatus according to claim 1, wherein the at least one memory and the computer program code are further configured to, with the at least one processor, cause the apparatus to:
   report at least one channel impulse response associated with the at least one tap value and location in a delay-Doppler plane for explicit feedback.

7. An apparatus, comprising:
   at least one processor; and
   at least one memory including computer program code; wherein the at least one memory and the computer program code are configured to, with the at least one processor, cause the apparatus to:
      receive at least one tap value and location that is associated with at least one common channel hardening matrix from a user equipment, wherein the at least one common channel hardening matrix is within a correlation time and bandwidth associated with a 2-dimensional fast Fourier transform and based on a first time periodicity, and the at least one tap value and location is associated with the at least one common channel hardening matrix and based on a second time periodicity.

8. The apparatus according to claim 7, wherein the 2-dimensional fast Fourier transform is configured to reduce reporting overhead 2-dimensional fast Fourier transform when applied to an aggregated channel.

9. The apparatus according to claim 7, wherein a granularity of the reporting is configured to be associated with breathing between correlation bandwidth and an entire bandwidth in a frequency domain between the correlation time and one subframe in a time domain.

10. A system comprising:
    a user equipment;
    at least one processor; and
    at least one memory including computer program code; wherein the at least one memory and the computer program code are configured to, with the at least one processor, cause the user equipment to:
       determine time and frequency domain correlation of at least one channel with respect to direction of at least one dominant Eigen beam;
       apply at least one common channel hardening matrix within a correlation time and bandwidth based on a first time periodicity:
       apply a 2-dimensional fast Fourier transform within the correlation time and bandwidth associated with the at least one common channel hardening matrix; and
       report at least one tap value and location based on a second time periodicity that is associated with the at least one common channel hardening matrix to at least one network entity.

11. The system according to claim 10, wherein a granularity for the CSI part 1 is configured with channel correlation time T and correlation bandwidth F for user equipment.

12. The system according to claim 10, wherein the at least one memory and the computer program code are further configured to, with the at least one processor, cause the user equipment to:
select at least one predefined discrete Fourier transform precoders associated with at least one set of Eigen beams as channel basis.

13. The system according to claim 10, wherein the 2-dimensional fast Fourier transform is configured to reduce reporting overhead when 2-dimensional fast Fourier transform is applied to an aggregated channel.

14. The system according to claim 10, wherein a granularity of the reporting is configured to be associated with breathing between correlation bandwidth and an entire bandwidth in a frequency domain between the correlation time and one subframe in a time domain.

15. An apparatus, comprising:
at least one processor; and
at least one memory including computer program code;
wherein the at least one memory and the computer program code are configured to, with the at least one processor, cause the apparatus to:
configure channel state information (CSI) feedback reporting granularity to user equipment, wherein the channel state information feedback comprises CSI part 1 and CSI part 2, the CSI part 1 and CSI part 2 are configured with different reporting granularity in frequency and time;
receive at least one of the CSI part 1 or CSI part 2 from the user equipment, wherein the CSI part 1 and CSI part 2 are associated with different periodicity and/or offset;
compute at least one uplink channel;
derive at least one channel hardening matrix; and
apply the at least one channel hardening matrix to frequency and time resources.

16. The apparatus according to claim 15, wherein a granularity for the CSI part 1 is configured with channel correlation time T and correlation bandwidth F for user equipment.

17. The apparatus according to claim 15, wherein the reporting granularity of the CSI part 1 is associated with breathing between correlation bandwidth F and an entire bandwidth in a frequency domain between the correlation time T and one subframe in a time domain.

18. The apparatus according to claim 15, wherein the CSI part 1 and the CSI part 2 include beam indexes and respective combining coefficients.

19. The apparatus according to claim 15, wherein the CSI part 1 and the CSI part 2 are received at different time instance.

20. The apparatus according to claim 15, wherein the CSI part 1 and the CSI part 2 include beam indexes or respective combining coefficients.

* * * * *